(12) United States Patent
Horiuchi et al.

(10) Patent No.: US 7,866,741 B2
(45) Date of Patent: Jan. 11, 2011

(54) DEFLECTOR OF SLIDING ROOF

(75) Inventors: Shigehito Horiuchi, Tochigi (JP); Hiroyuki Tsukamoto, Tochigi (JP)

(73) Assignee: Yachiyo Industry Co., Ltd., Saitama (JP)

( * ) Notice: Subject to any disclaimer, the term of this patent is extended or adjusted under 35 U.S.C. 154(b) by 0 days.

(21) Appl. No.: 12/508,231

(22) Filed: Jul. 23, 2009

(65) Prior Publication Data

US 2010/0019545 A1 Jan. 28, 2010

(30) Foreign Application Priority Data

Jul. 25, 2008 (JP) ............................. 2008-191881

(51) Int. Cl.
*B60J 7/22* (2006.01)
(52) U.S. Cl. ....................................................... 296/217
(58) Field of Classification Search .................. 296/217
See application file for complete search history.

(56) References Cited

U.S. PATENT DOCUMENTS 3,984,143 A * 10/1976 Vermeulen .................. 296/217
5,178,436 A * 1/1993 Eberius et al. ............... 296/217
7,178,862 B2 * 2/2007 Oechel ...................... 296/216.02

FOREIGN PATENT DOCUMENTS

| JP | 60-46328 A | 4/1985 |
| JP | 62-265022 A | 11/1987 |
| JP | 2-54627 U | 4/1990 |
| JP | 3668378 B2 | 4/2005 |

* cited by examiner

*Primary Examiner*—Dennis H Pedder
(74) *Attorney, Agent, or Firm*—Arent Fox, LLP

(57) ABSTRACT

The present invention provides a deflector including a blade along a front edge of an opening of a fixed roof, movable upward and downward when the opening is opened and closed; a deflector arm whose one end is coupled to a frame on a vehicle body and whose other end is rotatably coupled to the blade via a first coupling shaft; a link arm whose one end is coupled to the frame on the vehicle body and whose other end is rotatably coupled to the blade via a second coupling shaft; and urging means for permanently urging a force to displace the blade upward. A cam member including first and second cam slots is provided on the frame on the vehicle body, a middle portion of the link arm is slidably engaged via a first pin with the first cam slot and one end of the link arm is slidably engaged via a second pin with the second cam slot, and the blade is housed in a laid down state with its upper portion displaced backward, and gradually stands up as displaced upward from a position where the blade is housed.

5 Claims, 8 Drawing Sheets

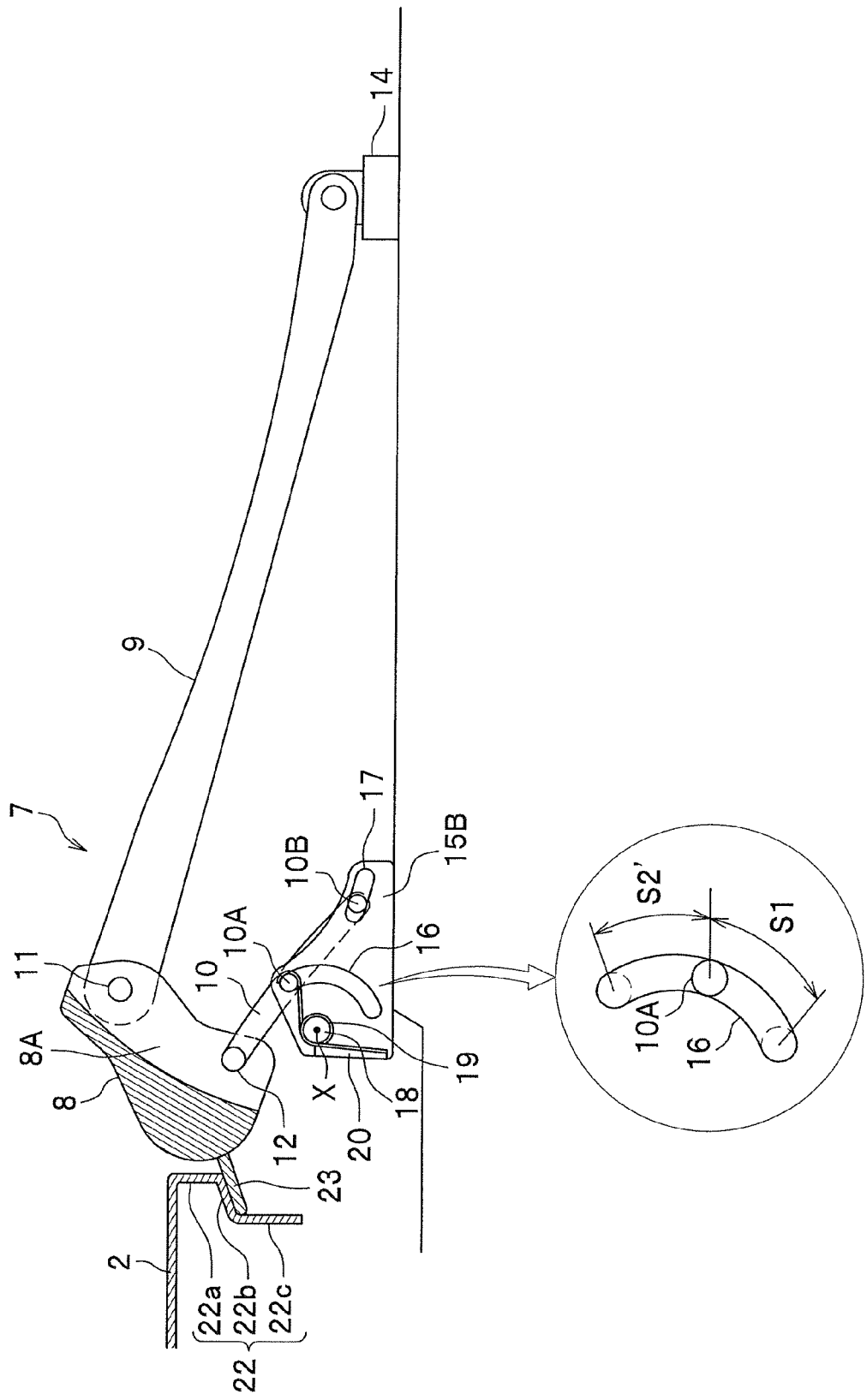

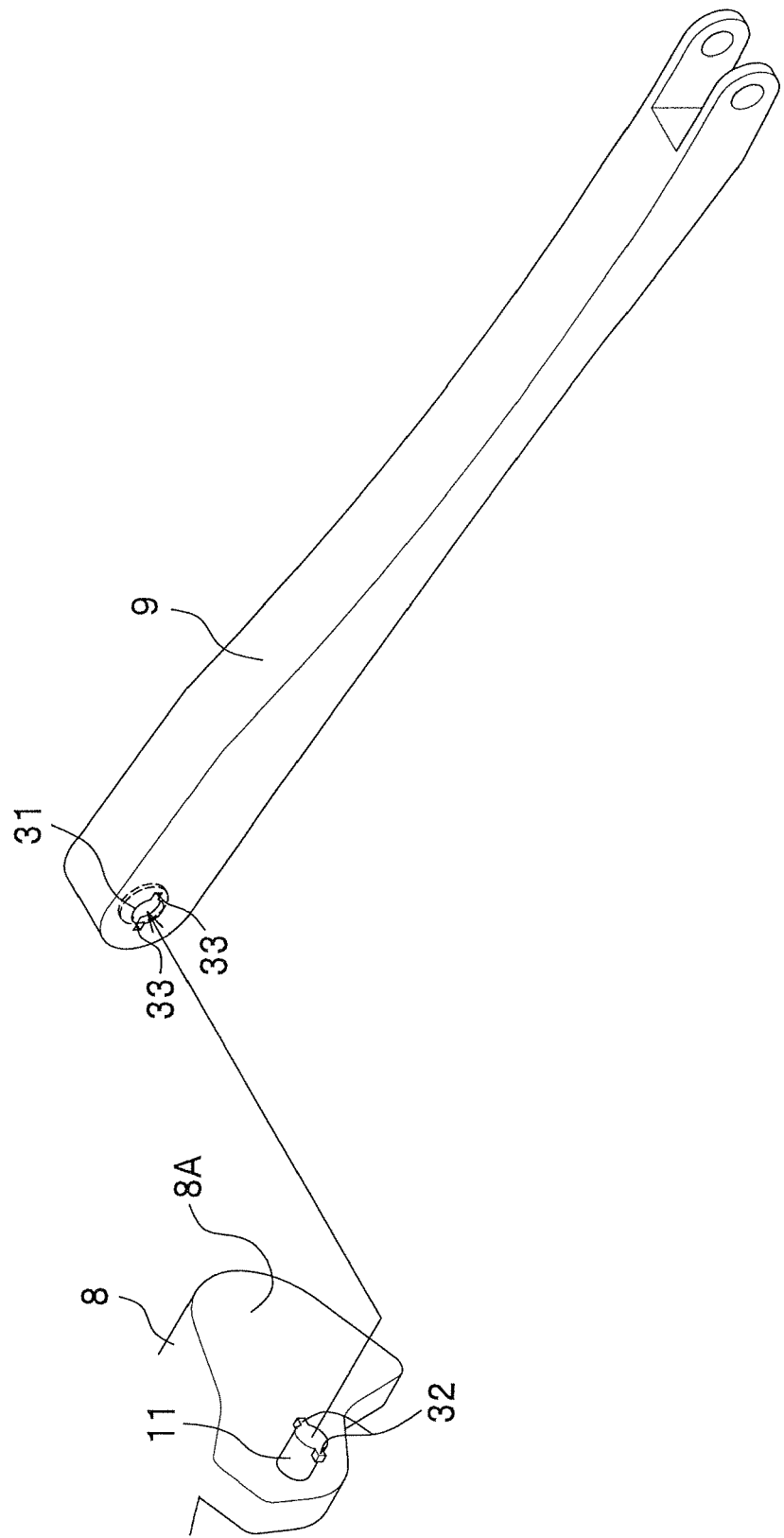

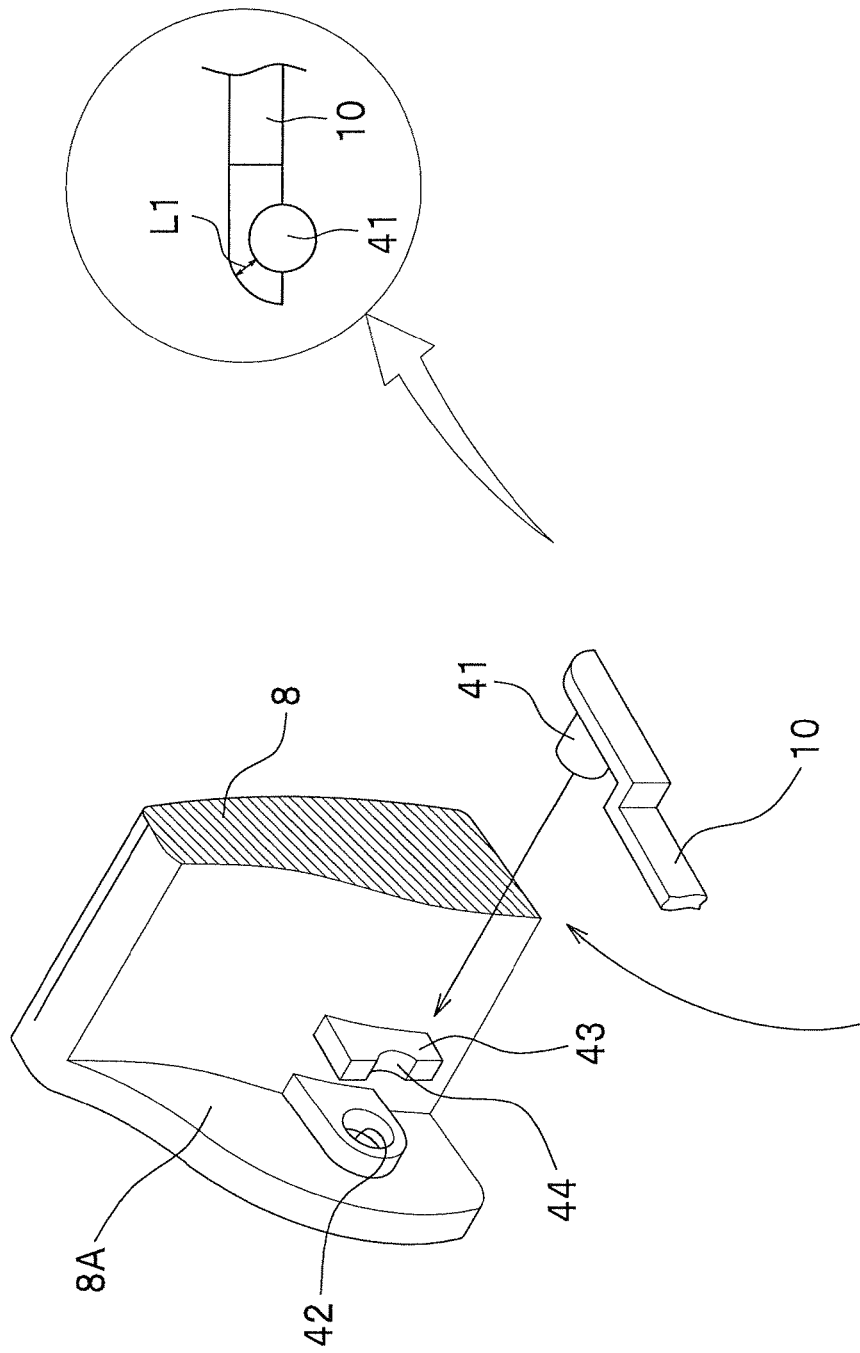

DEFLECTOR OF SLIDING ROOF

CROSS-REFERENCE TO RELATED APPLICATION

This application claims the foreign priority benefit under 35 U.S.C. §119 of Japanese Patent Application No. 2008-191881 filed on Jul. 25, 2008, the disclosure of which is incorporated herein by reference.

BACKGROUND OF THE INVENTION

1. Field of the Invention

The present invention relates to a deflector of a sliding roof of a vehicle.

2. Description of the Related Art

When a vehicle drives with an opening of its sliding roof opened, an airflow along the roof and air flow suctioned out of the inside of the vehicle interfere with each other, which causes periodical variations in air pressure in the opening of the roof and excites resonance, generating unpleasant harsh low frequency vibrations called as "wind throb".

Generally, as described in JP 3668378 B and JP 02-54627 U for example, it has been understood that wind throb is generated when the air flow along the roof hits a rear edge of the opening; therefore, in order to address such disadvantage, a sliding roof is provided with a deflector having a blade that projects upward from the front edge of the opening when the opening is opened. Such a deflector serves for deflecting air flow flowing over the roof in the diagonally upward in the front to rear direction by the blade thereof, so that the air flow more upwardly passing over without interfering with the rear edge of the opening of the sliding roof, thereby to reduce wind throb.

Recently, a sliding roof for a vehicle is tend to employ a larger opening in the front and rear direction of a vehicle to meet user's needs for interior comfort, etc. To satisfy such needs, as the length of an opening becomes larger, a deflector blade should be designed to have a greater height so as to let air flow pass more upwardly over the rear edge of the opening. On the other hand, it has also been desired to reduce a thickness of a sliding roof system so as to secure an interior height of a vehicle. In this sense, if employing a blade member with a greater projection height, it may be difficult to secure a housing space for housing the blade at the time of closing the sliding roof.

JP 02-54627 U discloses a technique to lay down a blade and house it when closing a sliding roof, as well as to turn and stand up the blade when opening the sliding roof. This technique realizes to ensure a greater blade projection height as well as a more housing space for housing the blade at the same time. However, the deflector disclosed in JP 02-54627 U has a structure requiring a pair of links as a turning mechanism, in which one is for turning the blade and the other is for standing up it; therefore, there are difficulties such as lower assemblability of the deflector.

In order to address the above difficulties, the present invention provides a deflector of a sliding roof having a structure to house a blade in a laid down state, facilitating a turning mechanism of the blade and realizing ease of assembly for the deflector.

SUMMARY OF THE INVENTION

The present invention provides a deflector of a sliding roof including a blade provided along a front edge of an opening of a fixed roof, movable upward and downward when the opening is opened and closed; a deflector arm whose one end is coupled to a frame on a vehicle body and whose other end is rotatably coupled to the blade via a first coupling shaft; a link arm whose one end is coupled to the frame on the vehicle body and whose other end is rotatably coupled to the blade via a second coupling shaft; and urging means for permanently urging a force to displace the blade upward. In this deflector, a cam member including a first cam slot and a second cam slot is provided on the frame on the vehicle body, and a middle portion of the link arm is slidably engaged via a first pin with the first cam slot and one end of the link arm is slidably engaged via a second pin with the second cam slot, and the blade is housed in a laid down state with an upper portion thereof displaced backward, and gradually stands up as displaced upward from a position where the blade is housed.

Other features and advantages of the present invention will become more apparent from the following detailed description of the invention when taken in conjunction with the accompanying exemplary drawings.

BRIEF DESCRIPTION OF THE DRAWINGS

FIG. 5 is a side view of the deflector according to the second embodiment of the present invention.

FIG. 7 is an exploded perspective view showing how to couple a side plate of the blade with the deflector arm.

FIG. 8 is an exploded perspective view showing how to couple the side plate of the blade with the link arm.

DETAILED DESCRIPTION OF THE PREFERRED EMBODIMENTS

First Embodiment

Figure 1:
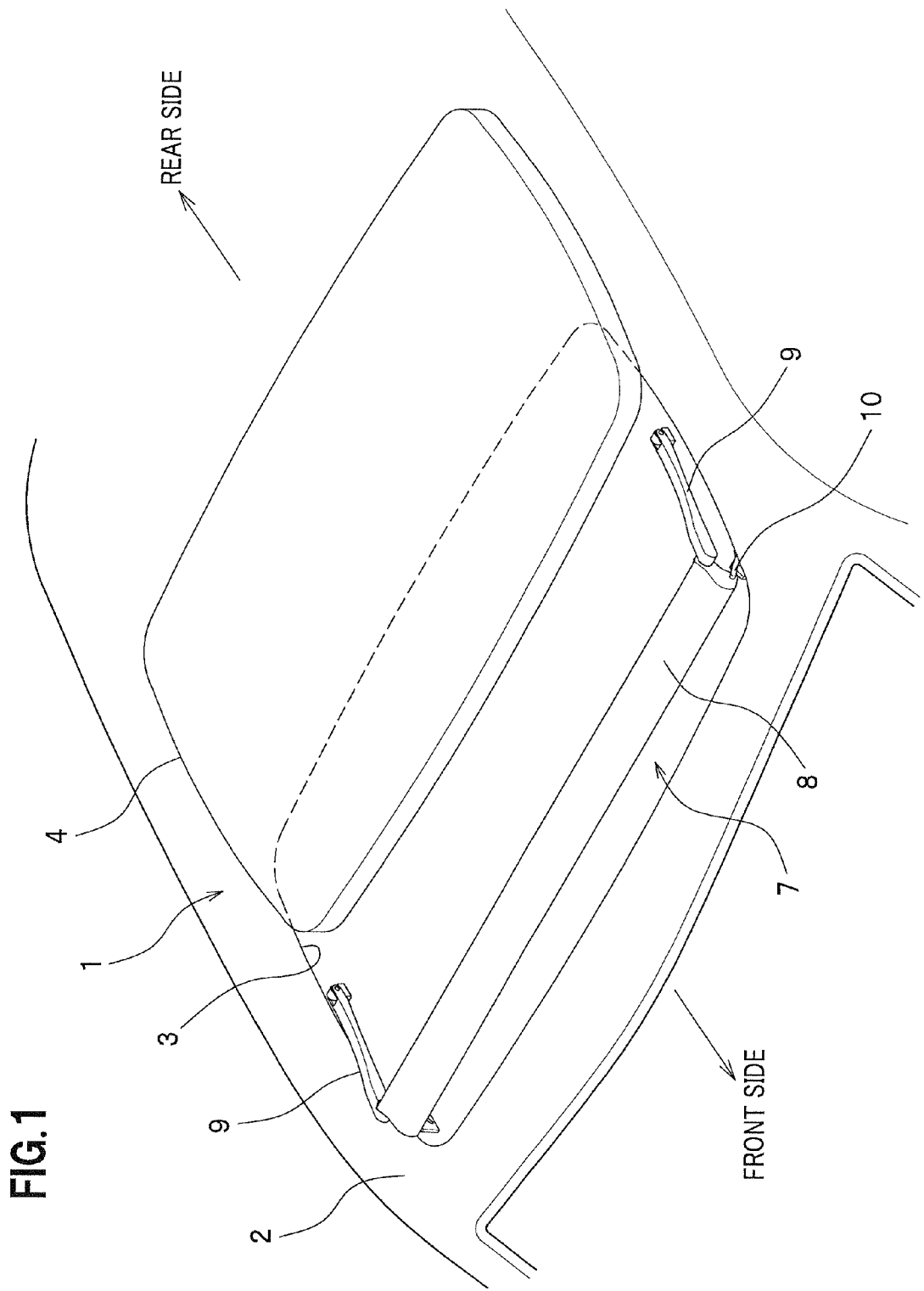
FIG. 1 is a perspective view of a sliding roof according to the present invention.
Figure 2:
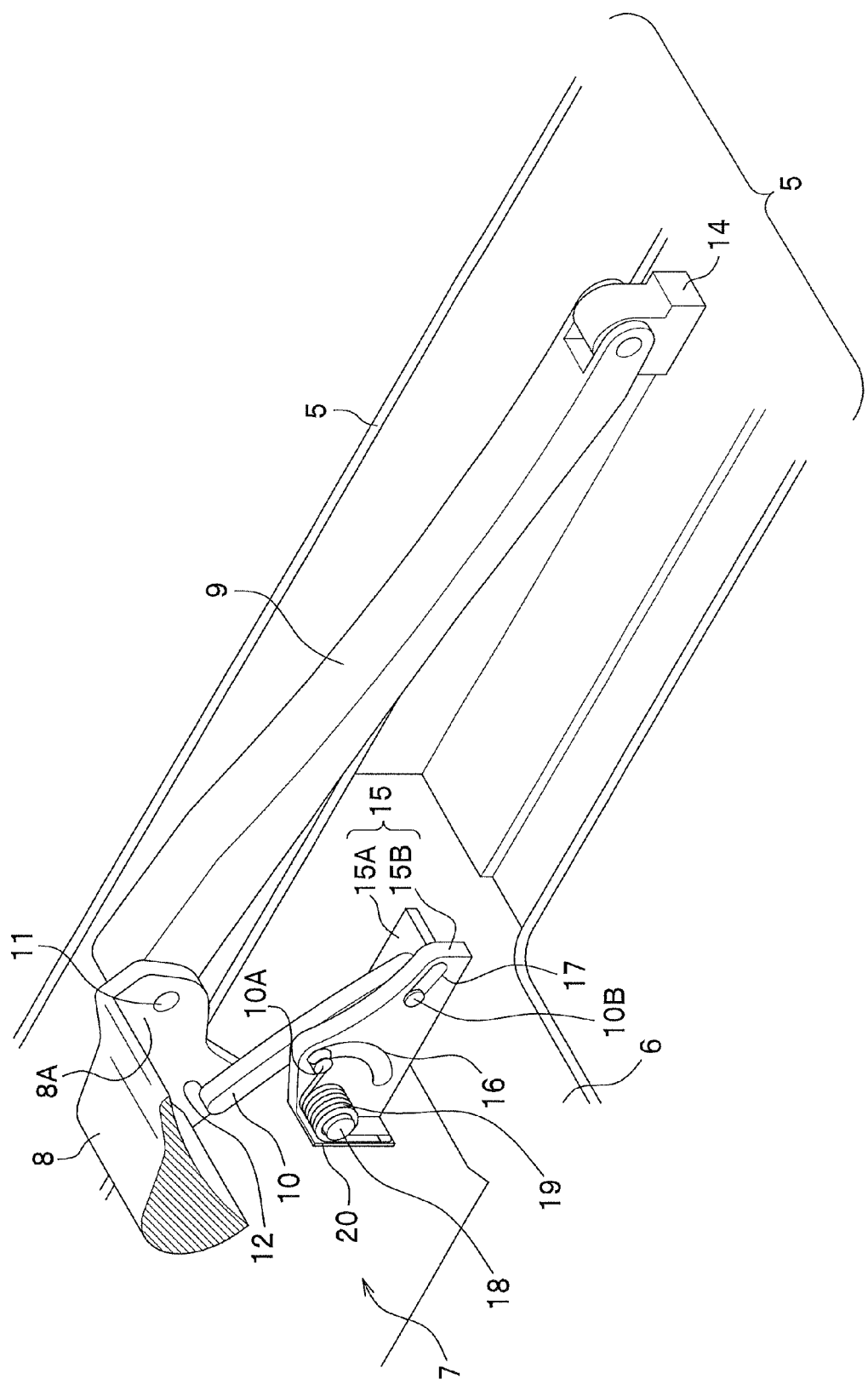
FIG. 2 is a partially enlarged perspective view of the deflector according to the first embodiment of the present invention.
Figure 3:
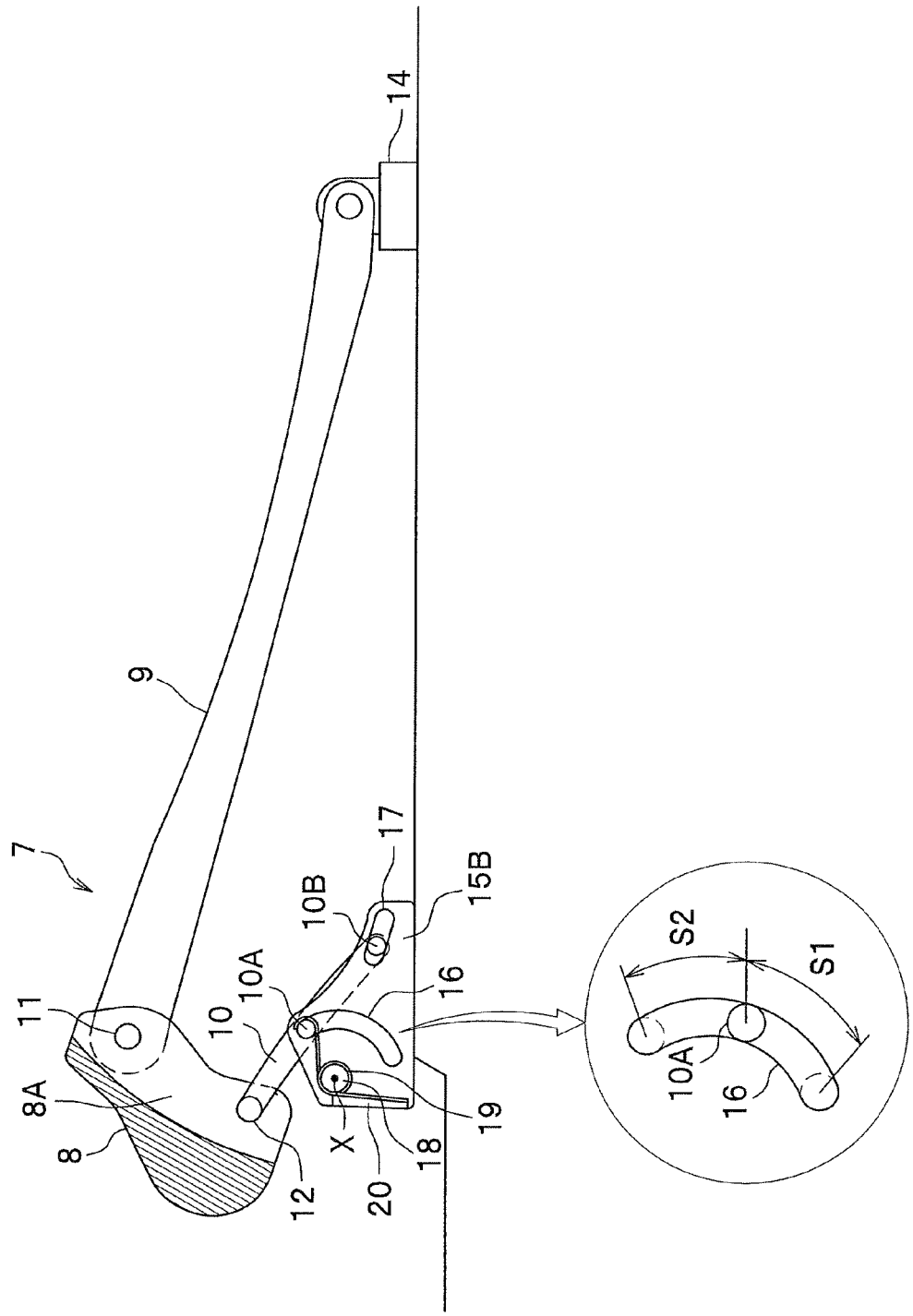
FIG. 3 is a side view of the deflector according to the first embodiment of the present invention.

FIG. 1 is a perspective view of a sliding roof, and FIGS. 2 and 3 are a partial perspective view and a side view of the deflector, respectively. The sliding roof of FIG. 1 is of an outer slider type, and is provided with the roof panel 4 that closes the rectangle opening 3 on the fixed roof 2 during the closing operation, and tilts up the rear edge of the roof panel 4 and moves backward during the opening operation. The roof panel 4 may be a panel made of glass, for example. In FIG. 1, the sliding roof is described as an outer-sliding type sliding roof with a single roof panel, but is not limited to this, and may also be applicable to various sliding roofs having a structure to open and close an opening thereof with a roof panel or panels, such as those having plural roof panels divided in the front and rear sides or of an inner-sliding type.

There are provided a guide frame 5 beneath both the edges of the opening 3, extending in the longitudinal (front and rear) direction of the vehicle (see FIG. 2). There is provided beneath the front edge of the opening 3 the front frame 6 (see FIG. 2) extending in the lateral (right and left) direction of the vehicle. The guide frame 5 and the front frame 6 are jointly formed (the guide frame 5 and the front frame 6 are also referred to as just "a frame on the vehicle body"). The guide frame 5 includes a guide rail that guides a slider (not shown)

coupled to the roof panel 4 and a drain, and also a sunshade guide rail that guides a sunshade not shown if necessary.

With reference to FIGS. 1 to 3, the deflector 7 according to the present invention includes the blade 8 provided along the front edge of the opening 3 of the fixed roof 2 such that the blade 8 moves upward and downward along with the opening and close operations of the opening 3; the deflector arm 9 whose one end is turnably coupled to the guide frame 5 via the first coupling shaft 11, and whose other end is turnably coupled to the blade 8 via the first coupling shaft 11; the link arm 10 whose one end is turnalbly coupled to the front frame 6 via the second coupling shaft 12, and whose other end is turnably coupled to the blade 8; and the torsion spring 19 as urging means that permanently urges the blade 8 to be displaced in the upward direction.

The arm support 14 is attached to the guide frame 5, and the deflector arm 9 at its rear end is axially supported to the arm support 14 such that the deflector arm 9 turns around the lateral axial direction of the vehicle, thereby to be turnably coupled to the guide frame 5. The side plate 8A along the longitudinal direction of the vehicle is formed at each lateral end of the blade 8. The side plate 8A and the front end of the deflector arm 9 are turnably coupled to each other via the first coupling shaft 11 having an axis in the lateral direction.

On the side plate 8A, there is provided the second coupling axis at a different position from the first coupling shaft 11, so that the side plate 8A and the front end of the link arm 10 are turnably coupled to each other via the second coupling shaft 12 as an axis in the lateral direction of the vehicle. When the blade 8 is in the stand-up state, the second coupling shaft 12 is located at a lower position from the first coupling shaft 11 toward the front side of the vehicle.

The cam member 15 is attached to the front frame 6. The cam member 15 includes the bottom portion 15A fixed on the upper surface of the front frame 6 and the vertical face portion 15B having a vertical face along the longitudinal direction of the vehicle, and may be formed of resin material or the like. There is provided the first cam slot 16, the second cam slot 17 in the vertical face portion 15B, and both the cam slots 16 and 17 are formed as through holes in a groove shape in the vertical face portion 15B. There are provided the pin 10A at the middle position of the link arm 10 and the pin 10B at rear position of the link arm 10, respectively, each projecting in the lateral direction of the vehicle. The pins 10A and 10B are slidably engaged respectively with the first cam slot 16 and the second cam slot 17. Specifically, the link arm 10 at its rear end is slidably and turnably supported in the second cam slot 17 of the cam member 15 such that the link arm 10 turns around the axis in the lateral direction of the vehicle.

The first cam slot 16 is formed in an arc-shape whose opening side faces toward the front side of the vehicle. The second cam slot 17 is formed in a straight line upwardly extending toward the front side of the vehicle. The spring support 18 in a cylindrical shape, laterally projecting, is provided on either face of the vertical face portion 15B at a position ahead of the first cam slot 16. A coil portion of the torsion spring 19 is wounded around the spring support 18, and this torsion spring 19 functions as the urging means. One end of the torsion spring 19 is in contact with the lower end of the pin 10A so as to urge the pin 10A upward, and the other end of the torsion spring 19 is locked to the stopper 20 projectedly provided at the front edge of the vertical face portion 15B. The tip end of the one end of the torsion spring 19 is formed to be hooked on the pin 10A, so that the torsion spring 19 is prevented from coming off the pin 10A. The first cam slot 16 is generally formed in an arc around the axial center of the spring support 18, that is, the coil axial center X of the torsion spring 19. Therefore, the arm length of the one end side of the torsion spring 19 relative to the pin 10A, which slides in the first cam slot 16 in an approximately arc trajectory around the coil axial center X, becomes approximately constant; and at this time, the position where the one end of the torsion spring 19 is hooked to the lower end of the pin 10A serves as a point of spring force application.

In the present invention, as displaced upward from the housing position thereof, the blade 8 gradually stands up, and the vertical distance between the first coupling shaft 11 and the second coupling shaft 12 becomes greater. While the first coupling shaft 11 moves in a rotational trajectory around the support axis on the arm support 14, the trajectory along which the second coupling shaft 12 moves is defined by the first cam slot 16. The second cam slot 17 serves for accepting displacement of the rear end of the link arm 10.

In the first embodiment, as shown in the enlarged view of FIG. 3, when the pin 10A moves along the first stroke S1 from the lower end to the middle position of the first cam slot 16, in the entire stroke of the pin 10A of the first cam slot 16, the blade 8 turns and stands up gradually as the blade 8 is displaced upward from the housing position while widening the distance in the vertical direction between the first coupling shaft 11 and the second coupling shaft 12. When moving in the second stroke S2 from the middle position to the upper end of the slot 16, the distance in the vertical direction between the first coupling shaft 11 and the second coupling shaft 12 is kept approximately constant, so as to displace the blade 8 upward with its stand-up state maintained. In the second stroke S2, the blade 8 is translated upward in the rear direction.

Figure 4A:
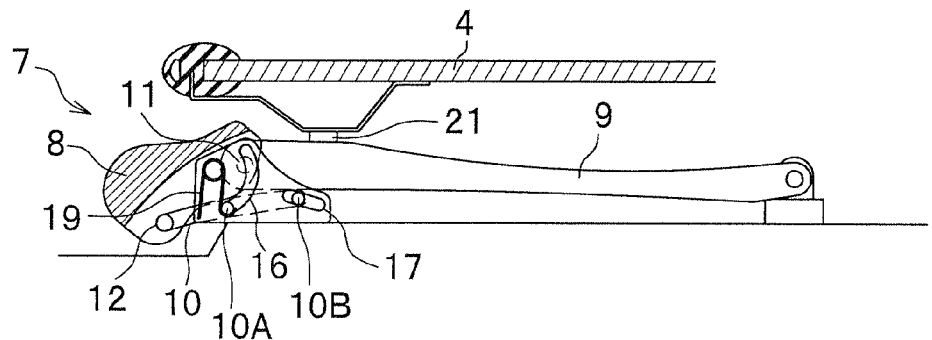
FIG. 4 is a view for explaining operations of the deflector according to the first embodiment of the present invention.

Descriptions are provided on operations of the above-mentioned deflector 7 with reference to FIG. 4. FIG. 4 is a view explaining operations of the defector 7, and FIG. 4A shows a state in which the opening 3 is closed by the roof panel 4. In this state, the pressing shoe 21 provided on the lower surface of the roof panel 4 pushes the deflector arm 9 downward against the urging force of the torsion spring 19. On this occasion, the pin 10A is positioned at the lower end of the first cam slot 16, and the distance in the vertical direction between the first coupling shaft 11 and the second coupling shaft 12 becomes smaller, so that the blade 8 is laid down and housed with its upper portion positioned backward.

Figure 4B:
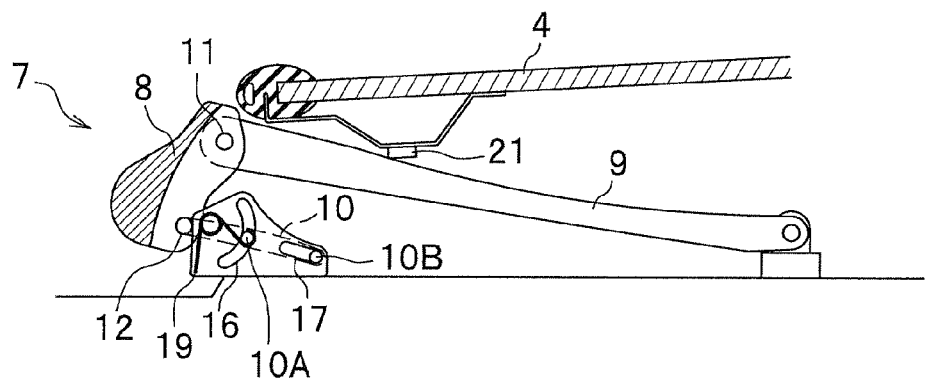

As shown in FIG. 4B, when the roof panel 4 slides slightly backward and the pressing point of the pressing shoe 21 against the deflector arm 9 moves backward, the pin 10A moves upward due to the urging force of the torsion spring 19. The second coupling shaft 12 moves upward along the predetermined trajectory via the link arm 10, and the first coupling shaft 11 turns around the support axis of the arm support 14. As mentioned above, when the pin 10A moves along the stroke S1 (see FIG. 3), the distance in the vertical direction between the first and second coupling shafts 11, 12 becomes greater, and the blade 8 turns and stands up gradually as displaced upward from the housing position, and eventually the blade 8 completely stands up at the upper end of the first stroke S1.

Figure 4C:
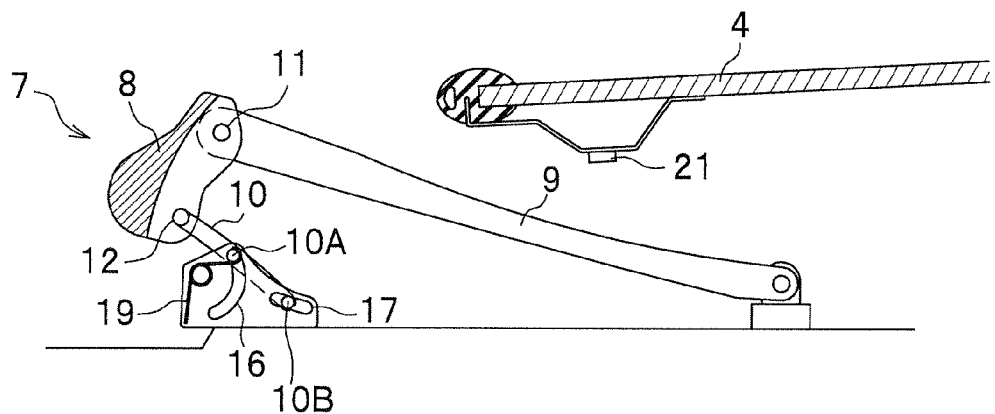

When the roof panel 4 further slides backward and the pin 10A moves along the second stroke S2 (see FIG. 3), the distance in the vertical direction between the first and second coupling shafts 11, 12 scarcely varies, therefore, the blade 8 is displaced upward with its stand-up state maintained (see FIG. 4C). During the above operations, the pin 10B slides along the second cam slot 17. In order to close the opening 3, the above operations are carried out in the reverse order, and the detailed explanations for this are omitted.

As mentioned above, in the present invention, the blade 8 is housed in a laid down state, and gradually stands up from the housing position as displaced upward, thereby to reduce a height of the housing space for housing the blade 8, as well as to allow the blade 8 to project more greatly from the fixed roof 2. The cam member 15 including the first cam slot 16 and the second cam slot 17 is mounted onto a frame on the vehicle body (the front frame 6 in the present embodiment, for example), and the middle portion and one end of the link arm 10 are slidably engaged via a pin with the first and second cam slots 16, 17, respectively, which requires only a single link arm 10 without requiring a pair of links as required in an prior art. This simplifies the turning mechanism of the blade 8, thereby to enhance assemblability of the deflector 7.

According to the first embodiment, the first cam slot 16 is made in a shape including the first stroke S1 and the second stroke S2; and the first stroke S1 guides the pin 10A to let the blade 8 gradually stands up as displaced upward from the housing position, and the second stroke S2 guides the pin 10A to let the blade 8 that has completely stood up through the first stroke S1 move upward with its stand-up state maintained. Since the second stroke S2 is provided, the projection of the blade 8 can be increased by just that much.

Since the torsion spring 19 is attached to the cam member 15 so as to function as the urging means that pushes the pin 10A engaged with the first cam slot 16, and the first cam slot 16 is formed in an arc shape approximately around the coil axial center X of the torsion spring 19, the arm length of the torsion spring 19 on its one side has a constant distance to the point of spring force application thereof, so that torque applied to the pin 10A can be maintained at constant. Accordingly, it is possible to perform the stand-up and lay-down operations of the blade 8 very smoothly, so that the pin 10A scarcely gets caught in the first cam slot 16.

Second Embodiment

FIG. 5 is a side view of the deflector 7 and FIG. 6 is a view for explaining the operations of the deflector 7 according to the second embodiment, respectively. In the second embodiment, the following features are the same as those of the first embodiment: the cam member 15 including the first cam slot 16 and the second cam slot 17 is attached to a frame on the vehicle body (such as the front frame 6); and the link arm 10 is slidably engaged via pins to the first cam slot 16 at the middle portion of the link arm 10 and also to the second cam slot 17 at one end of the link arm lo, respectively; and the blade 8 is laid down and housed with its upper portion backward, and the blade 8 gradually stands up as disposed upward from the housing position; and the torsion spring 19 pushing the pin 10A that is engaged to the first cam slot 16 is attached to the cam member 15 so as to function as the urging means, and the first cam slot 16 is formed in an arc shape approximately around the coil axial center X of the torsion spring 19. Note that the same numerical references are used for the same components, and detailed descriptions are omitted.

In the second embodiment, there is provided the front edge frame 22 vertically extending at the front edge of the opening of the fixed roof 2. Specifically, the front edge frame 22 includes the front edge upper portion 22a vertically extending from the front edge of the opening of the fixed roof 2, the front edge slope portion 22b downwardly sloped frontward from the lower end of the front edge upper portion 22a, and the front edge lower portion 22c vertically extending from the lower end of the front edge slope portion 22b (see FIG. 5).

The lip 23 projecting frontward is provided at the lower portion of the blade 8. As shown in FIG. 5, the lip 23 functions for sealing a gap by abutting the front edge frame 22 when the blade 8 comes to the uppermost position. FIG. 5 shows a state in which the upper face of the lip 23 is in contact with the front edge slope portion 22b, and at this time, the tip end of the lip 23 slightly or almost comes in contact with the front edge lower portion 22c. The lip 23 prevents a wind flow through the gap between the fixed roof 2 and the blade 8.

The lip 23 may be made of extruded rubber material prepared in a conventional technique, for example, as a separate part different from the blade 8, and one end of the lip 23 is press-fit into a slit formed in the lower portion of the blade 8. For some occasions, the lip 23 and the blade 8 may be integrally made as a single unit.

In such a configuration, the first cam slot 16 has a shape including the first stroke S1 that guides the pin A to let the blade 8 turn in a direction to gradually stand up as displaced upwards from the housing position thereof (see FIG. 6B), and the second stroke S2' that guides the pin 10A to let the blade 8 that has completely stood up through the first stroke S1 turn in a direction to be laid down (see FIG. 6D), and move gradually upward. This turn of the blade 8 in the direction to be laid down with the second stroke S2' prevents an interfere of the lip 23 against the front edge frame 22. The first cam slot 16 of the second embodiment is formed in an arc-shape whose opening side faces toward the front side of the vehicle, although slightly different from that of the first embodiment. The pin 10A slides along the first cam slot 16 in an arc-line approximately around the coil axial center X.

Figure 6A:
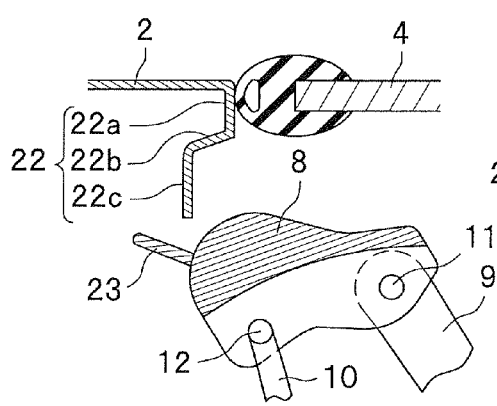
FIG. 6 is a view for explaining operations of the deflector according to the second embodiment.

With reference to FIGS. 6A to 6E and also FIG. 5 if necessary, the operation of the deflector 7 is described hereinafter. FIG. 6A shows a state of the opening 3 closed by the roof panel 4. In this state, the pressing shoe 21 (not shown in the second embodiment, see FIG. 4) pushes the deflector arm 9 downward against the urging force of the torsion spring 19. In this state, although not shown in FIG. 6, the pin 10A is located at the lower end of the first cam slot 16, the distance between the first and second coupling shafts 11 and 12 in the vertical direction becomes smaller, and the blade 8 is housed in a laid down state such that the upper portion thereof is located backward. The lip 23 is located in the front of the front edge frame 22 so as not to interfere with the front edge frame 22.

When the roof panel 4 slightly slides backward and a pressing point of the pressing shoe 21 against the deflector arm 9 moves backward, the pin 10A moves upward in the first cam slot 16 due to the urging force of the torsion spring 19. Due to the link arm 10, the second coupling shaft 12 moves upward along the predetermined trajectory, and the first coupling shaft 11 turns around the spindle of the arm support 14, whereby the blade 8 turns anticlockwise and stands up, as shown by the arrow in FIG. 6B. When the pin 10A reaches the terminal point of the first stroke S1, this anticlockwise turn of the blade 8 is completed (see the state of FIG. 6C). During this anticlockwise turn of the blade 8, the lip 23 moves without being in contact with the lower end of the front edge lower portion 22c of the front edge frame 22.

Figure 6D:
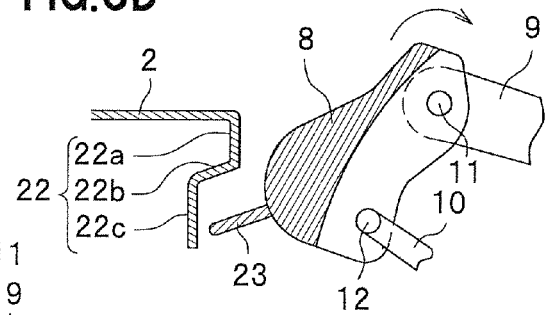
Figure 6B:
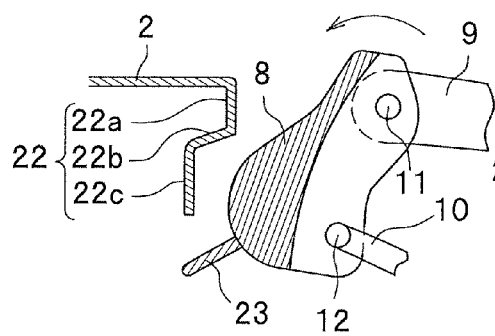
Figure 6E:
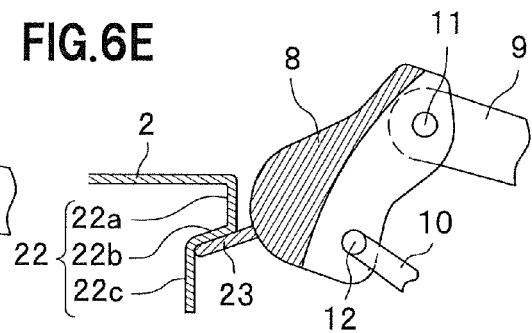
Figure 6C:
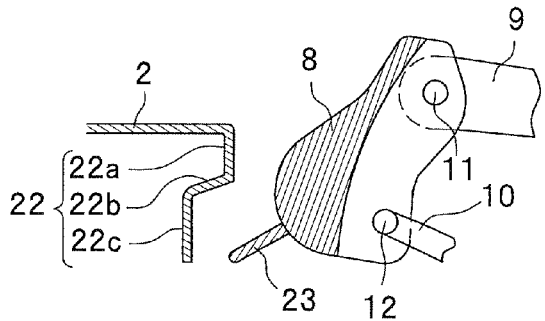

In the state of FIG. 6C in which the pin 10A reaches the terminal point of the first stroke S1, there is a gap between the front edge lower portion 22c of the front edge frame 22 and the tip end of the lip 23. Now it is assumed that the blade 8 is displaced upward, maintained in the stand-up state similar to the case of the first embodiment, or the blade 8 is further turned anticlockwise to stand up. Since the blade 8 displaces backward due to the deflector arm 9 when moving upward, in order to seal the gap such that the lip 23 comes in contact with the front edge frame 22 when the blade 8 comes at the uppermost position, the lip 23 should be secured to come in contact with the front edge frame 22 already in the state of FIG. 6C (by increasing the area contactedly overlapped between the front edge slope portion 22b and the upper face of the lip 23, for example). In such a case, taking account of its backward movement, the lip 23 needs be pushed and bent against the front edge frame 22. In this state, when the blade 8 moves up and down, the lip 23 rubs against the front edge frame 22, causing an unpleasant noise, or the lip 23 may be damaged due to an excessive force applied onto the lip 23.

To counter such difficulties, in the second embodiment, a gap is provided between the front edge lower portion 22c of the front edge frame 22 and the tip end of the lip 23, and this gap becomes narrower as the blade 8 is displaced upward and frontward at its lower portion by reversely turning the blade 8 clockwise with the second stroke S2' as shown in FIG. 6D. When the blade 8 reaches the uppermost position as shown in FIG. 6E, the lip 23 comes in contact with a predetermined portion of the front edge frame 22 so as to seal the gap.

As described above, the turn of the blade 8 in the direction to be laid down with the second stroke S2' prevents such an interference of the lip 23 against the front edge frame 22, thereby to prevent an unpleasant harsh noise due to rubs and damage of the lip 23.

As aforementioned, the preferred embodiments of the present invention have been described. Now, with reference to FIGS. 7 and 8, descriptions are provided on specific examples of how to couple the deflector arm 9 and the link arm 10 with the blade 8, respectively. FIG. 7 is an exploded perspective view showing how to couple the deflector arm 9 with the side plate 8A of the blade 8. The first coupling shaft 11 is projectedly provided on the side plate 8A, and the coupling hole 31 into which the first coupling shaft 11 is rotatably fit is provided in the deflector arm 9. The lock claws 32 are formed at the end of the first coupling shaft 11, and the lock holes 33 are formed at the edge of the coupling hole 31, thereby to securely fix the first coupling shaft 11 into the coupling hole 31 so that a decoupling therebetween can be prevented. The lock claws 32 go through the lock hole 33 only when they are assembled, and the lock claws 32 will not be detached from the lock hole 33 as far as the deflector 7 operates in the normal operating range once they are completely assembled.

FIG. 8 is an exploded perspective view showing how to couple the link arm 10 with the side plate 8A of the blade 8. The coupling shaft 41 is projectedly provided on the side face of one end of the link arm 10. The coupling shaft 41 has a semicircular portion that protrudes from the longitudinal edge of the link arm 10. L1 represents a relief size that accepts turning movement of the link arm 10. The coupling hole 42 is provided in the side plate 8A, and the locking projection 43 is projectedly provided on the back face of the blade 8. The arc concave portion 44 is provided on the upper face of the locking projection 43 such that the protruding semicircular portion of the coupling shaft 41 passes through this arc concave portion 44. As mentioned above, when assembling the above mentioned elements, the protruding semicircular portion of the coupling shaft 41 is let to pass through the arc concave portion 44, and then the coupling shaft 41 is inserted into the coupling hole 42, whereby the link arm 10 is set to turn in the normal operating range of the deflector 7. Within the normal operating range of the deflector, the link arm 10 at its relief size L1 is always held by the side plate 8A and the locking projection 43, so that the coupling shaft 41 will not get detached from the coupling hole 42.

As described above, the present invention provides a coupling structure to insert a coupling shaft into a coupling hole when assembling them, and after the assembling, to prevent the coupling shaft from getting detached from the coupling hole, thereby to realize a simple coupling structure using fewer elements for the assembling.

The present invention is not limited to descriptions of the attached drawings, and may be varied or modified without departing from the spirit and scope of the present invention. The present invention secures a greater projection of a blade, which can be more effective particularly if applied to a sliding roof having a larger opening that is likely to cause wind throb, such as a sliding roof with movable roof panels divided into front and rear sections.

The present invention provides a deflector of a sliding roof with a mechanism to house its blade in a laid down state, realizing ease of assembly with a simple turning mechanism of the blade.

Specifically, the deflector according to the first embodiment of the present invention houses its blade in a laid down state and lets the blade gradually stands up as the blade is displaced upward from the housing position, thereby to reduce height of the housing space for the blade, as well as increase projection of the blade from the fixed roof. In addition, the cam member including the first and second cam slots is provided to a frame on the vehicle body, where the link arm at its middle position is slidably engaged via a pin with the first cam slot and the link arm at its one end via a pin with the second cam slot. With such a structure, not a pair of link arms but only a single arm is needed, which simplifies a turning mechanism of the blade, realizing ease of assembly for the deflector.

In the deflector according to the first embodiment of the present invention, the first cam slot has a shape including the first stroke that guides the pin to let the blade gradually stand up as displaced upwards from the housing position thereof, and the second stroke that guides the pin to let the blade that has completely stood up through the first stroke move upward with its stand-up state maintained.

In such a deflector, since the second stroke is provided, the projection of the blade can be increased by just that much.

In the deflector according to the second embodiment of the present invention, there are provided the front edge frame that extends vertically at the front edge of the opening of the fixed roof, and the lip that comes in contact with the front edge frame so as to seal the gap, and the first cam slot has a shape including the first stroke that guides the pin to let the blade turn in a direction to gradually stand up as displaced upwards from the housing position thereof, and the second stroke that guides the pin to let the blade that has completely stood up through the first stroke turn in a direction to be laid down, and move gradually upward. This turn of the blade in the direction to be laid down with the second stroke prevents an interfere of the lip against the front edge frame.

In such a deflector, the lip 23 can be prevented from rubbing against the front edge frame 22 during the blade displacement.

In addition, the second embodiment of the present invention provides the urging means attached to the cam member, which includes the torsion spring to push the pin engaged with the first cam slot, and the first cam slot is formed in an arc shape approximately around the coil axial center of the torsion spring.

In such a deflector, the length of the arm on one side of the torsion spring has a constant distance to the point of spring force application thereof, so that torque applied to the pin can be maintained at constant. Accordingly, the blade can stand up and get laid down very smoothly, so that the pin scarcely gets caught in the first cam slot 16.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A deflector of a sliding roof comprising:
   a blade provided along a front edge of an opening of a fixed roof, movable upward and downward when the opening is opened and closed;
   a deflector arm whose one end is coupled to a frame on a vehicle body and whose other end is rotatably coupled to the blade via a first coupling shaft;
   a link arm whose one end is coupled to the frame on the vehicle body and whose other end is rotatably coupled to the blade via a second coupling shaft; and
   urging means for permanently urging a force to displace the blade upward,
   wherein
   a cam member including a first cam slot and a second cam slot is provided on the frame on the vehicle body, and
   a middle portion of the link arm is slidably engaged via a first pin with the first cam slot and one end of the link arm is slidably engaged via a second pin with the second cam slot, and
   the blade is housed in a laid down state with an upper portion thereof displaced backward, and gradually stands up as displaced upward from a position where the blade is housed.

2. The deflector of a sliding roof as claimed in claim 1, wherein
   the first cam slot has a shape including a first stroke that guides the first pin to let the blade gradually stand up as displaced upward from the position where the blade is housed, and a second stroke that guides the first pin to let the blade that has completely stood up through the first stroke move upward with its stand-up state maintained.

3. The deflector of a sliding roof as claimed in claim 1, wherein
   a front edge frame extending vertically is provided at the front edge of the opening of the fixed roof,
   a lip extending frontward is provided at a lower portion of the blade such that the lip comes in contact with the front edge frame when the blade reaches an uppermost position so as to seal a gap between a tip end of the lip and the front edge frame,
   the first cam slot has a shape including a first stroke that guides the first pin to let the blade turn in a direction to gradually stand up as displaced upward from the position where the blade is housed, and a second stroke that guides the first pin to let the blade that has completely stood up through the first stroke turn in a direction to be laid down, and move gradually upward, and
   the turn of the blade with the second stroke prevents an interference of the lip against the front edge frame.

4. The deflector of a sliding roof as claimed in claim 2, wherein
   the urging means is provided to the cam member and comprises a torsion spring that pushes the first pin engaged with the first cam slot, and
   the first cam slot is formed in an arc shape approximately around a coil axial center of the torsion spring.

5. The deflector of a sliding roof as claimed in claim 3, wherein
   the urging means is provided to the cam member and comprises a torsion spring that pushes the first pin engaged with the first cam slot, and
   the first cam slot is formed in an arc shape approximately around a coil axial center of the torsion spring.

* * * * *